April 24, 1928.
F. H. GIBBONS
VALVE STEM ATTACHMENT
Filed April 3, 1926
1,667,594
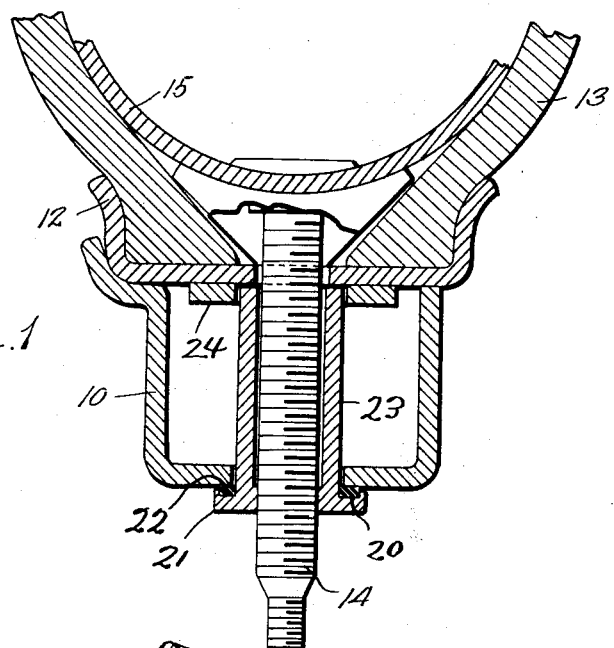
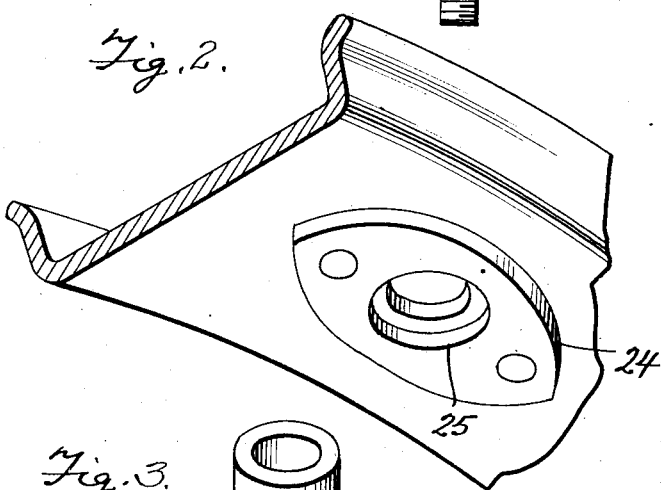
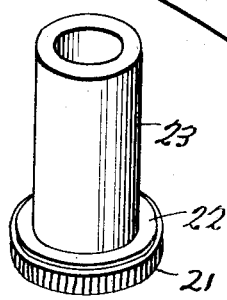

Patented Apr. 24, 1928.

1,667,594

UNITED STATES PATENT OFFICE.

FORREST H. GIBBONS, OF RUSSELL, NEW YORK.

VALVE-STEM ATTACHMENT.

Application filed April 3, 1926. Serial No. 99,643.

This invention relates to attachments for use upon and in conjunction with the usual and conventional form of pneumatic tire valves for protecting the latter against the rubbing and wearing effect of the openings provided in the wheel and tire rims, as well as the wheel felly especially when the tire is used when flat or deflated.

With the above and other objects in view, the invention further includes the following novel features and details of construction, to be hereinafter more fully described, illustrated in the accompanying drawings, and pointed out in the appended claims.

Figure 1 is a sectional view of the invention with a plate provided upon the under side of the tire rim and abutting and interfitting the inner end of the valve stem protector;

Figures 2 and 3 are perspectives of the plate and portion of a tire rim, and of the invention in its entirety.

Referring to the drawings in detail, wherein like characters of reference denote corresponding parts, the reference character 10 indicates a wheel felly, 11, 12 a tire rim having a tire casing 13 fitted thereon while the conventional form of tire valve 14 extends from an inner tube positioned within the tire casing and extends outwardly therefrom and through registering openings provided in the tire rim 12, wheel felly 10 in the usual manner. All of the above being of the usual and well-known construction and which form no part of the present application for Letters-Patent but which is merely mentioned for purposes of illustration in bringing forward the novel advantages of the above entitled invention.

In carrying out the invention I provide a sleeve member 23 adapted to be extended within an opening in the wheel felly 10. The outer end of the sleeve being adapted for reception within a relatively large centrally disposed opening 25 provided in a plate member 24 carried upon the inner side of the tire rim 12. The peripheral edges of the sleeve engage the rim around an opening therein to receive a valve stem 14. The latter being adapted for threaded engagement with a combined flange portion and jam nut portion 21. A resilient packing 22 carried within an annular groove 20 provided in the outer side of the jam nut portion being adapted to frictionally engage the adjacent side of the wheel felly to prevent displacement of the sleeve.

It will thus be noted from the foregoing description and accompanying drawings that the invention provides an exceedingly useful and advantageous attachment or accessory for use upon wheels and in conjunction with the pneumatic tire valves therefor which will protect the outer threaded side walls from becoming worn or rubbed and which further provides a protection against the usual and grave difficulty of the edges of the openings provided in the wheel and tire rims from causing leaks in the valve stem when the latter is loose or the tire deflated.

The invention is susceptible of various changes in its form, proportions and minor details of construction, and the right is herein reserved to make such changes as properly fall within the scope of the appended claims.

Having thus described my invention, what is claimed is:

1. An attachment for use upon and in conjunction with pneumatic tire valves comprising a sleeve provided with an outwardly extending annular flange upon one end and periphery thereof, said flange having an annular groove upon its under side to seat a resilient washer adapted for frictional engagement with the outer side of a wheel felly and for encircling the valve stem opening therein, the flange being adapted for threaded engagement with the valve stem, and means carried upon the inner side of the rim adapted for engagement with the inwardly extending end of the sleeve.

2. An attachment for use upon and in conjunction with pneumatic tire valves comprising a sleeve provided with an outwardly extending annular flange upon one end and periphery thereof, said flange having an annular groove upon its under side for seating a resilient washer adapted for frictional engagement with the outer side of a wheel felly and for encircling the valve stem opening therein, the inner edges of the annular flange portion being adapted for threaded engagement with valve stem, and a plate carried upon the under side of a tire rim having a relatively large opening therein registering with an opening in the rim for receiving the inwardly extending end portion of the sleeve to hold the latter against rocking and canting movement to preserve the outer threaded walls of the valve stem.

In testimony whereof I affix my signature.

FORREST H. GIBBONS.